F. H. HOWARD.
PORTABLE CRANE.
APPLICATION FILED SEPT. 7, 1915.
1,193,551.
Patented Aug. 8, 1916.
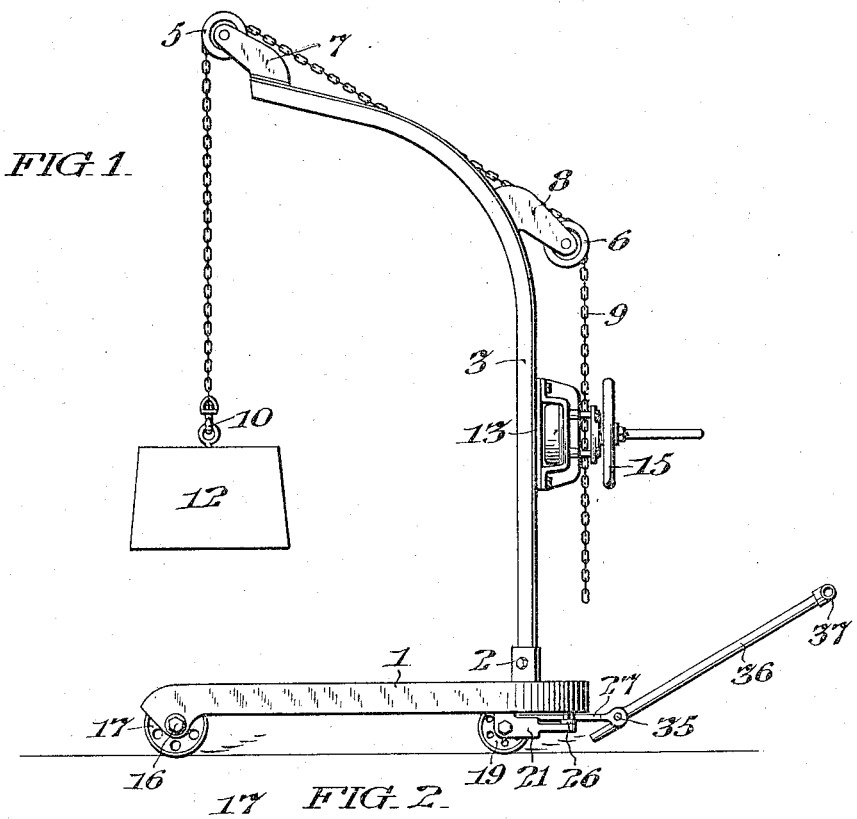
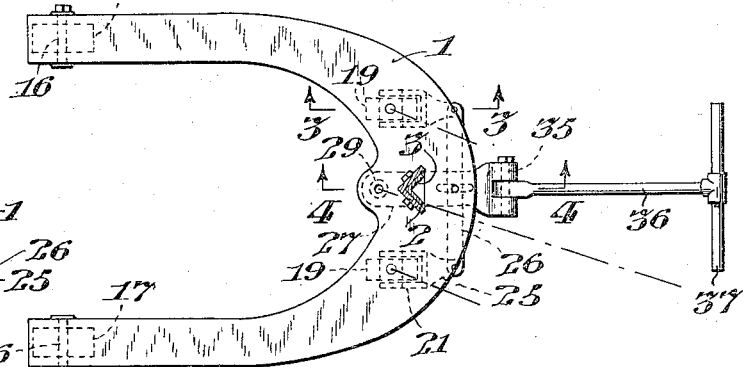
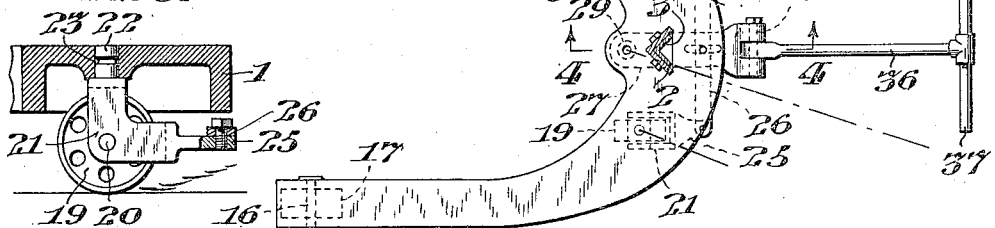
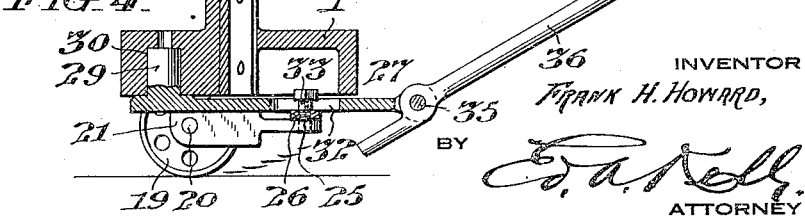
INVENTOR
FRANK H. HOWARD,
BY
ATTORNEY

UNITED STATES PATENT OFFICE.

FRANK H. HOWARD, OF READING, PENNSYLVANIA.

PORTABLE CRANE.

1,193,551.  Specification of Letters Patent.  Patented Aug. 8, 1916.

Application filed September 7, 1915. Serial No. 49,143.

*To all whom it may concern:*

Be it known that I, FRANK H. HOWARD, a citizen of the United States, residing at Reading, in the county of Berks and State of Pennsylvania, have invented certain new and useful Improvements in Portable Cranes, of which the following is a specification.

My invention relates particularly to the smaller type of crane and is especially directed to the carrier or truck by which the hoisting mechanism is moved about.

The principal objects of my invention are to provide a dirigible truck for the hoisting mechanism, that may be provided with rollers affording a four point support to prevent tilting, and to provide means for simultaneously directing two of said rollers and maintaining them in parallel planes.

Specifically stated my invention comprehends a truck frame having a pivoted draw-bar and provided with a pair of rollers mounted upon stationary axes, and a pair of rollers which are mounted upon relatively movable axes, and which are so connected with said draw-bar that when it is turned to one side or the other, said rollers will be correspondingly deflected from their straight course.

My invention also includes all of the various novel features of construction and arrangement as hereinafter more specifically set forth.

In the accompanying drawings Figure 1 is a side elevational view of a portable crane constructed in accordance with my invention; Fig. 2 is a plan view of the truck upon which the hoisting mechanism is mounted, the jib and its supporting boss being shown in section for convenience of illustration; Fig. 3 is a fragmentary vertical sectional view taken through the truck frame on the line 3—3 in Fig. 2, showing one of the casters comprising the dirigible rollers, and Fig. 4 is a fragmentary vertical sectional view taken through the truck frame and draw-bar on the line 4—4 in Fig. 2, showing the connection between said draw-bar and one of the dirigible casters.

In said figures the truck frame 1 which as shown in Fig. 2 is preferably U-shaped, is provided with the boss 2 forming a suitable socket arranged to receive the jib 3 which extends vertically from the forward end of the truck and curves rearwardly toward the top, in a plane disposed centrally between the arms of the U-shaped truck frame 1.

The jib 3 is provided with pulleys 5 and 6 mounted to rotate in the bearings 7 and 8 respectively projecting rearwardly from the free end of the jib and forwardly from the curved portion, and said rollers are arranged to carry the chain 9 which is provided with the hook 10 for engagement with the load 12, and which is connected to be actuated by the hoisting mechanism 13 conveniently operated by the hand-wheel 15.

The truck frame 1 is as shown in Figs. 3 and 4 preferably channel bar construction and the vertical walls of the free extremities of the arms of the U-shaped structure provide convenient bearings for the shafts 16 of the rollers 17.

The forward end of the truck frame 1 is supported upon the relatively spaced casters comprising the caster rollers 19 mounted on the shafts 20 in the caster frames 21 which are each provided with a pivot pintle 22 suitably mounted in a bearing socket 23 in said truck frame 1 and a forwardly projecting arm 25 by which it may be steered or guided.

The caster arms 25 are connected by the yoke or link 26 to which they are pivotally engaged, and said link 26 is loosely connected intermediate of said casters with the draw-bar 27 which has the trunnion 29 pivotally engaged in the bearing socket 30 in the truck frame 1 and which has the longitudinally extending slot 32 through which the bolt 33 carried by said link 26 extends, so that any movement of the draw-bar to the right or to the left will, as may be observed by the dot and dash lines in Fig. 2, cause the lateral movement of the link 26 and the consequent movement of said casters in the same general direction as said draw-bar.

As shown in Figs. 1, 2 and 4 the forward or free end of the draw-bar is pivotally connected by the bolt 35 with the T-shaped handle bar 36 having the transverse handle 37 by which the truck may be drawn.

It will be obvious that a crane having a truck constructed in accordance with my invention may be readily guided from place to place, and will be provided with a firm support without danger of tilting.

I do not desire to limit my invention to the precise details of construction and arrangement herein set forth as it is obvious that various modifications may be made therein without departing from the essential features of my invention as defined in the appended claims.

Having thus described my invention I claim—

1. In a portable truck, the combination of a channeled frame, a pair of rollers mounted upon stationary axes, a pair of rollers mounted upon relatively movable axes, caster frames in which the movable rollers are mounted, forwardly projecting arms on said caster frames, a yoke connecting said arms, a draw bar formed with a trunnion on its inner end, a socket in the frame for engagement with said trunnion, said draw bar having a longitudinal slot, a bolt carried by said yoke and adapted to travel in said slot, and an operating handle pivotally attached to the free end of the draw bar.

2. In a portable truck the combination of a substantially U-shaped, channeled frame, a stationary roller mounted in each free extremity of said frame, a pair of caster frames rotatably mounted in the frame near the opposite end thereof, each of said caster frames having a forwardly projecting arm, rollers mounted in said caster frames, a yoke attached to and connecting the said projecting arms, a bolt carried by said yoke at its longitudinal center, a draw bar formed with a trunnion at its inner end, a bearing socket in the frame to accommodate said trunnion, said draw bar having a longitudinal slot adapted to be engaged by said bolt, and an operating handle attached to the free end of the yoke.

3. The combination of a truck frame, a set of movable rollers, a caster frame for each roller, said caster frames each being formed with a pivot pintle and a forwardly projecting arm, a draw bar formed with a trunnion at its inner end, a socket in the frame to provide a single pivot point for the draw bar, said draw bar being slotted longitudinally, a yoke connecting the ends of the caster arms, and a bolt carried by said yoke and in engagement with said slot.

In testimony whereof I affix my signature.

FRANK H. HOWARD.

Copies of this patent may be obtained for five cents each, by addressing the "Commissioner of Patents, Washington, D. C."